United States Patent [19]
Neu et al.

[11] Patent Number: 6,020,983
[45] Date of Patent: Feb. 1, 2000

[54] METHOD FOR THE MANUFACTURE OF EYE-COVERING ARTICLES BEARING DECORATIVE REFLECTION HOLOGRAMS

[75] Inventors: Martha J. Neu, Brookline; James J. Sullivan, Jr., Winchester, both of Mass.

[73] Assignee: Polaroid Corporation, Cambridge, Mass.

[21] Appl. No.: 08/697,609

[22] Filed: Aug. 27, 1996

Related U.S. Application Data

[63] Continuation-in-part of application No. 08/393,093, Feb. 22, 1995, abandoned.

[51] Int. Cl.[7] ........................................................ G03H 1/00
[52] U.S. Cl. ................................ 359/14; 359/32; 264/1.1; 351/51
[58] Field of Search ..................... 359/1, 14, 15, 359/19, 32; 351/51; 264/1.1, 1.7, 2.7

[56] References Cited

U.S. PATENT DOCUMENTS

| | | | |
|---|---|---|---|
| D. 354,298 | 1/1995 | Keong | D16/306 |
| 4,315,665 | 2/1982 | Haines | 359/3 |
| 4,637,678 | 1/1987 | Moss et al. | 359/15 |
| 4,786,125 | 11/1988 | Magarinos et al. | 359/7 |
| 4,790,613 | 12/1988 | Moss | 359/15 |
| 4,830,441 | 5/1989 | Chang | 359/15 |
| 4,840,444 | 6/1989 | Hewitt | 359/3 |
| 4,859,048 | 8/1989 | Jannard | 351/159 |
| 5,035,474 | 7/1991 | Moss et al. | 359/13 |
| 5,103,323 | 4/1992 | Magarinos et al. | 359/8 |
| 5,235,441 | 8/1993 | Georgaras et al. | 359/15 |
| 5,432,623 | 7/1995 | Egan et al. | 359/15 |

FOREIGN PATENT DOCUMENTS

| | | | |
|---|---|---|---|
| 0317685 | 5/1989 | European Pat. Off. | G02B 5/32 |
| 2588674 | 4/1987 | France | G02C 11/02 |
| 2159975 | 12/1985 | United Kingdom | G02B 7/10 |
| WO88/04439 | 6/1988 | WIPO | G02C 7/10 |

OTHER PUBLICATIONS

Royal Holographic Art Gallery: The Ultimate Catalog of Holograms [Webpages], Accessible on the Internet, http://www.islandnet.com/~Royal/index.html and . ./home4.html (Browsed using Netscape on Apr. 1996).

Jose R. Magarinos and Daniel J. Coleman. "Holographic optical configurations for eye protection against lasers." *Applied Optics*, vol., 26, No. 13. Jul. 1987. pp. 2575–2581.

PCT International Search Report for PCT/US96/01972 (Forms PCT/ISA/210 and 220). (mailed Jun. 14, 1996).

*Primary Examiner*—Thong Nguyen
*Assistant Examiner*—Darren E. Schuberg
*Attorney, Agent, or Firm*—Renato M. de Luna

[57] ABSTRACT

A method is provided for the manufacture of a holographic eye-covering article, the eye-covering article having an interference pattern corresponding to a predetermined three-dimensional object holographically prerecorded in a planar hologram layer, the interference pattern capable of being "played back" to an observer without being "played back" to said bearer. Functionality of the eye-covering article is effected in part by a light transmissive eyepiece, the eyepiece being uniaxially-curved and preferably comprising in sequence a thin web, a planar layer comprising the holographically prerecorded interference pattern, an adhesive layer, and a rigid optical substrate.

9 Claims, 6 Drawing Sheets

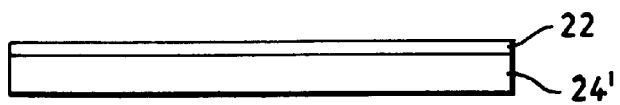
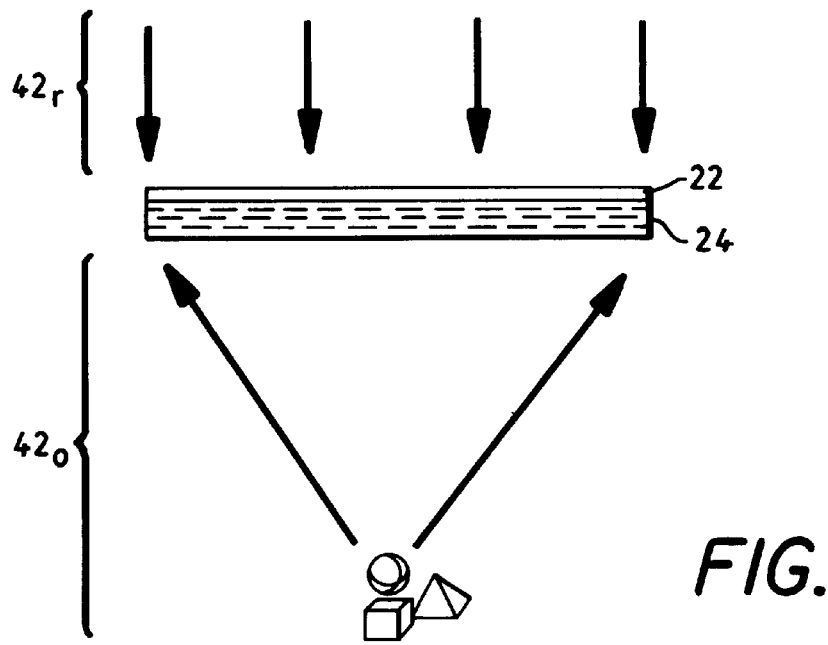
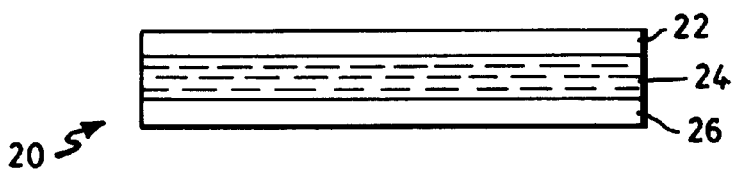
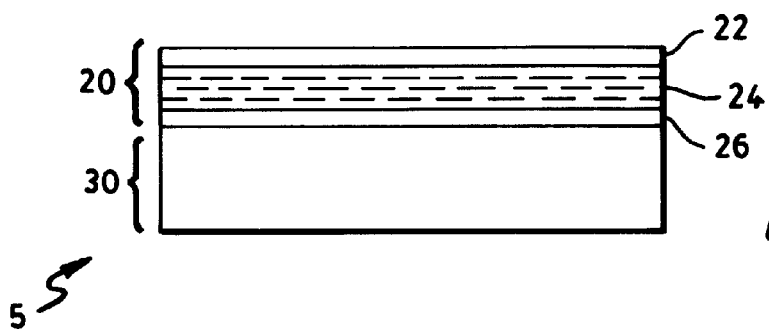

METHOD FOR THE MANUFACTURE OF EYE-COVERING ARTICLES BEARING DECORATIVE REFLECTION HOLOGRAMS

The present application is a continuation-in-part of U.S. patent application Ser. No. 08/393,093, filed Feb. 22, 1995, now abandoned.

FIELD OF THE INVENTION

In general, the present invention relates to an eye-covering article capable of being worn by a bearer, and more particularly, to a method for the manufacture of an eye-covering article bearing a reflection hologram, a decorative image holographically recorded in the reflection hologram capable of being "played back" to an observer without being "played back" to a bearer.

BACKGROUND OF THE INVENTION

Holography is an image-recording process distinct from other image-recording processes; both the phase and amplitude of, for example, a coherent wavefront "modified" by interaction with a three-dimensional object (i.e., "interrupted"), is recorded onto a recording medium. The phase and amplitude information thus stored can be reconstructed (i.e., "played back") to provide a three-dimensional image of the original three-dimensional object.

In the production of holograms in general, an object to be imagewise recorded is irradiated with a first component split from a coherent radiation source (e.g., from a laser). Irradiation reflected from the object is directed toward an appropriately sensitized recording medium (e.g., a photographic plate or a photopolymeric medium). A beam of such object-interrupted coherent radiation is commonly termed an object beam. At the same time, a second component split from the coherent radiation source is directed to the recording medium, bypassing the object A beam of such coherent radiation is commonly termed a reference beam. The interference pattern resultant of the interaction of the reference beam and the object beam contemporaneously impinging on the recording medium is latently recorded in the recording medium. When the exposed recording medium is processed (e.g., for development of the latent recordation) and subsequently appropriately irradiated and observed at an appropriate angle (i.e., generally an angle correspondent with the incident angle of the reference beam), the irradiation interacts with the interference pattern (cf., the hologram) to reconstruct the wavefront that originally reached the recording medium as reflected from the object. A holographically reconstructed image is produced.

With evolution of the underlying technology, the practice of holography has proliferated into several and diverse applications. Among such applications, the utilization of reflective display holograms in pendants, rings, belt buckles, action figures, novelties, and the like, has generated considerable consumer interest. Commercial interest in sunglasses (and other eyewear) embodying display holograms has also emerged. But, development of sunglasses carrying an imprinted display hologram has been frustrated by the need to still maintain adequate visibility though the sunglasses.

In attempts to resolve such problems, recent proposals have suggested use of embossed reflective display holograms.

An embossed reflective display hologram is typically formed from an off-axis master hologram in a multi-step process. The first step usually involves making the master off-axis hologram where the real object is positioned some distance from the surface of the recording medium and the reference beam is a collimated or parallel beam. The second step usually involves illuminating the master off-axis hologram with a collimated beam of light to project a real image of the object into space. A second hologram is then made by positioning a new recording medium at the position of the projected real image and by introducing a new reference beam at an angle. In making embossed holograms, the recording medium used in this second step is typically a holographic photoresist. A holographic photoresist is material which, when holographically exposed and developed, yields a surface profile whose depth is proportional to the intensity of the incident irradiation. The third step of making an embossed hologram usually involves coating the surface of the holographic photoresist exposed in the second step with a conducting metal, such as silver, then immersing the coated hologram in an electroplating bath to plate a layer, such as a layer of nickel, thereon. The fourth step involves using the nickel plate layer as a hard master to emboss the interference pattern into plastic that has been softened by heat, pressure, solvents, or some combination thereof in a continuous fashion. Finally, in the last step, after embossing, the plastic is typically coated with a highly reflecting metal, like aluminum, to enhance the reconstruction efficiency of the embossed hologram.

In the aforementioned proposals to utilize embossed reflective display holograms for sunglasses, it was found that by replacing the "highly reflecting metal" of conventional embossed holograms with a partially reflecting metal (or like composition), one could produce sunglasses having some holographic functionality while maintaining some degree of visibility therethrough. Accordingly, the specification of U.S. Pat. No. 4,315,665 (Haines) proposes a composite optical element which comprises a first layer or substrate bearing holographic information in the form of a surface pattern, a thin coating which conforms to the surface pattern and is either partially reflective or is of a transparent material of which the reflection index is different from the reflective index of said substrate and third layer which fills in the surface variations of said coating, the third layer being optically transparent, having a refractive index equal to that of the first layer. Likewise, U.S. Pat. No. 4,840,444 (Hewitt) proposes a composite holographic element comprising a substrate having on one surface a relief pattern providing a holographic image, a partially reflective layer facing said surface, and a thin optically absorbent layer adjacent the substrate.

In considering the use of embossed reflective display holograms for sunglasses, certain observations are made. First, it is believed that, in general, a holographic image produced in reflection by such an element will be undesirably dim. Moreover, if the thin reflective coating (or intermediate layer) is increased in thickness to enhance the brightness of such a hologram the desirable optical performance of the sunglasses in other respects may be degraded. While aforementioned U.S. Pat. No. 4,840,440 (Hewitt), attempts to resolve these problems, neither Hewitt nor Haines address a central drawback of such sunglasses: i.e., reliance on a partially reflecting layer (or the like) to accomplish desirable holographic functionality. Use of such layer narrows the product's configuration and appearance (cf., "mirror-like" sunglasses), as well as introduces complex electroplating processes (or the like) into its manufacture.

The present invention departs from the proposed utilization of embossed reflective display holograms, and instead, focuses on and draws upon the technology relating to volume phase reflection holograms. While the general concept of using volume phase reflection holograms as such is not new (see UK Patent Application GB 2 159 975 A, published Dec. 11, 1985), the known prior art methods of making such articles cannot be easily implemented for mass production and/or compromise product quality.

Briefly, in forming a volume phase reflection hologram, an object beam and a reference beam impinge upon an appropriate recording medium from opposite sides (see e.g., FIG. 2b), with planes of resulting interference fringes being formed substantially parallel to the surface of the recording medium. The planes are spaced apart within the recording medium at a distance which is generally equal to one-half the wavelength of the recording light divided by the index of refraction of the recording medium. Typical recording media used in the art are fine grained silver halide emulsions (for which the interference fringe planes comprise regions of high density of developed silver) or dichromated gelatin or photopolymer (for which the interference fringe planes comprise regions of slight differences in the index of refraction in comparison with lower exposed regions). When a volume phase reflection hologram is illuminated with white light, only light having the same wavelength as that of the light that was used in recording is reflected back to the viewer. While the present inventors do not wish to be limited to any theory in explanation of their invention, it is believed that this occurs because the interference fringe planes that are stacked a half wavelength apart will only coherently backscatter light of that wavelength, i.e., they allow constructing interference. All other wavelengths destructively interfere and are scattered out of the field of view because they do not match the spacing of the planes.

In an application of such technology, the present inventors have developed a methodology—well suited for mass production—that provides desirable utilization of volume phase reflection holograms in, for example, sunglasses, goggles, helmet visors, novelty eyewear, and the like. The resultant articles are durable and of good quality. Further, good reconstruction efficiencies are achieved without the requirement of a reflective metallic coating. Unburdened by electroplating processes (and like processes), the articles may be manufactured more economically and with greater variety.

SUMMARY OF THE INVENTION

The subject matter of the present invention is directed to a method for making an eye-covering article, such as sunglasses, goggles, a helmet visor, novelty eyewear, and the like. The eye-covering article encompassed by the invention is intended and designed to be worn by an individual (i.e., the "bearer"), with an eyepiece thereof superimposed over at least one eye of said bearer. In particular, an eye-covering article made according to the present invention comprises a light transmissive eyepiece and fitting means. The eyepiece—preferably a single uniaxially curved element covering both eyes of the bearer—comprises a laminar holographic element and a rigid optical or otherwise light transmissive substrate. The laminar holographic element in itself comprises a planar hologram layer interposed between a light transmissive web and a light transmissive adhesive layer.

The hologram layer is configured as a planar layer having an interference pattern recorded therein, the interference pattern being holographically representative of a predetermined three-dimensional object. Inspection of the planar hologram layer will reveal the interference pattern as being composed of a multiplicity of fringes laying substantially parallel to the major surfaces of the planar hologram layer. The relationships extant among the optical substrate, the web, and the fringe configuration of the planar hologram layer—relationships which account for the functionality of principal embodiments of the claimed invention—result from the method of recording the desired predetermined three-dimensional object in the planar hologram layer.

In particular, the interference pattern is provided by the combination of an object beam and a reference beam in the planar hologram layer. The reference beam impinges upon the planar hologram layer from a first side. At the same time, the object beam impinges upon the planar hologram layer from a second side opposite the first side subsequent to interruption by the desired predetermined three-dimensional object.

With the planar hologram layer so produced and combined with the other components of the eyepiece, a final product is completed by incorporating the finished eyepiece with fitting means. The fitting means utilized are those capable of positioning the eyepiece onto a bearer so that the eyepiece is superimposed over an eye of said bearer, the eyepiece being superimposed with the first side of the planar hologram layer (i.e., the side upon which the reference beam impinged) remote from said eye and the second side (i.e., the side upon which the object beam impinged) facing said eye. By this arrangement, the recorded interference pattern can be played back (with ambient white light) to an observer facing the first side without being played back to said bearer.

In light of the above, an objective toward which the present invention is directed is the provision of a durable eye-covering article having an eyepiece, the eyepiece being uniaxially curved and having an interference pattern composed of fringes laying substantially parallel to the major surfaces of a planar hologram layer.

Another objective toward which the present invention is directed is the provision of a durable eye-covering article having an interference pattern composed of fringes laying substantially parallel to the major surfaces of a planar hologram layer, the interference pattern of the eye-covering article capable of being played back to an observer without being played back to a bearer of the article.

Another objective toward which the present invention is directed is the provision of an eye-covering article having a prerecorded planar hologram layer deposited between a light transmissive web and a rigid optical substrate, whereby the prerecorded planar hologram layer is protected on one side by the light transmissive web, and on the other side by the rigid optical substrate.

Another objective toward which the present invention is directed is the provision of an eye-covering article having in a light transmissive eyepiece thereof an interference pattern capable of being played back to an observer, said play back being accomplished without reliance on a metallic, light reflecting layer incorporated into the eyepiece.

Another objective toward which the present invention is directed is the provision of a method for the mass production of an eye-covering article having a light transmissive eyepiece, the eyepiece having an interference pattern composed of fringes laying substantially parallel to the major surfaces of a planar hologram layer.

Another objective toward which the present invention is directed is the provision of a method for manufacturing an eye-covering article, the method involving a holographic exposure wherein a coherent exposure beam impinges a recording medium through an optically transparent protective web.

With these and other objects in view which will more readily appear as the nature of the invention is better understood, the invention subsists in its novel construction and its novel combination and assembly of parts hereinafter more fully described, illustrated, and claimed with reference being made to the attached drawings.

BRIEF DESCRIPTION OF THE DRAWINGS

FIGS. 2A to 2G schematically illustrate a method for manufacturing an eye-covering article according to a representative method embodiment of the present invention.

In general.

FIG. 4 illustrates another product embodiment of the present invention, this embodiment characterized in part by configuration of a laminar holographic element as a "decal" and utilization of hinged, ear-engaging arms;

FIG. 5 illustrates a cross-sectional view of the embodiment illustrated in FIG. 4 seen along axis 4—4;

FIG. 6 illustrates a rear view (i.e., from a bearer's side) of another product embodiment of the present invention, this embodiment having indirect fitting means; and FIG. 7 illustrates a rear elevational view of the embodiment illustrated in FIG. 6, the view illustrating in better detail the aforementioned indirect fitting means.

DETAILED DESCRIPTION OF THE INVENTIVE SUBJECT MATTER

By the present invention, there is provided an eye-covering article capable of being worn by a bearer, the eye-covering article comprising a light transmissive eyepiece, the light transmissive eyepiece comprising a planar hologram layer with an interference pattern recorded therein, the interference pattern corresponding to a predetermined three-dimensional object. The eye-covering article is designed such that a "3-D" image of the holographically recorded object can be "played back" (i.e., reconstructed)— under normal ambient lighting conditions—to an observer, without being played back to its bearer.

Herein, the term "covering" (as used in "eye-covering article") should not be construed as connoting concealment, masking, shielding, shading, or the like. Rather, "covering" should be construed in terms of the relative positional and functional relationships established when the eye-covering article is worn by a bearer, such relationships being set forth in the present description. Thus, for example, an optically clear lens superimposed over a bearer's eye to be viewable therethrough, while not "concealing" or "shading" said eye, nonetheless "covers" said eye.

Figure 1:
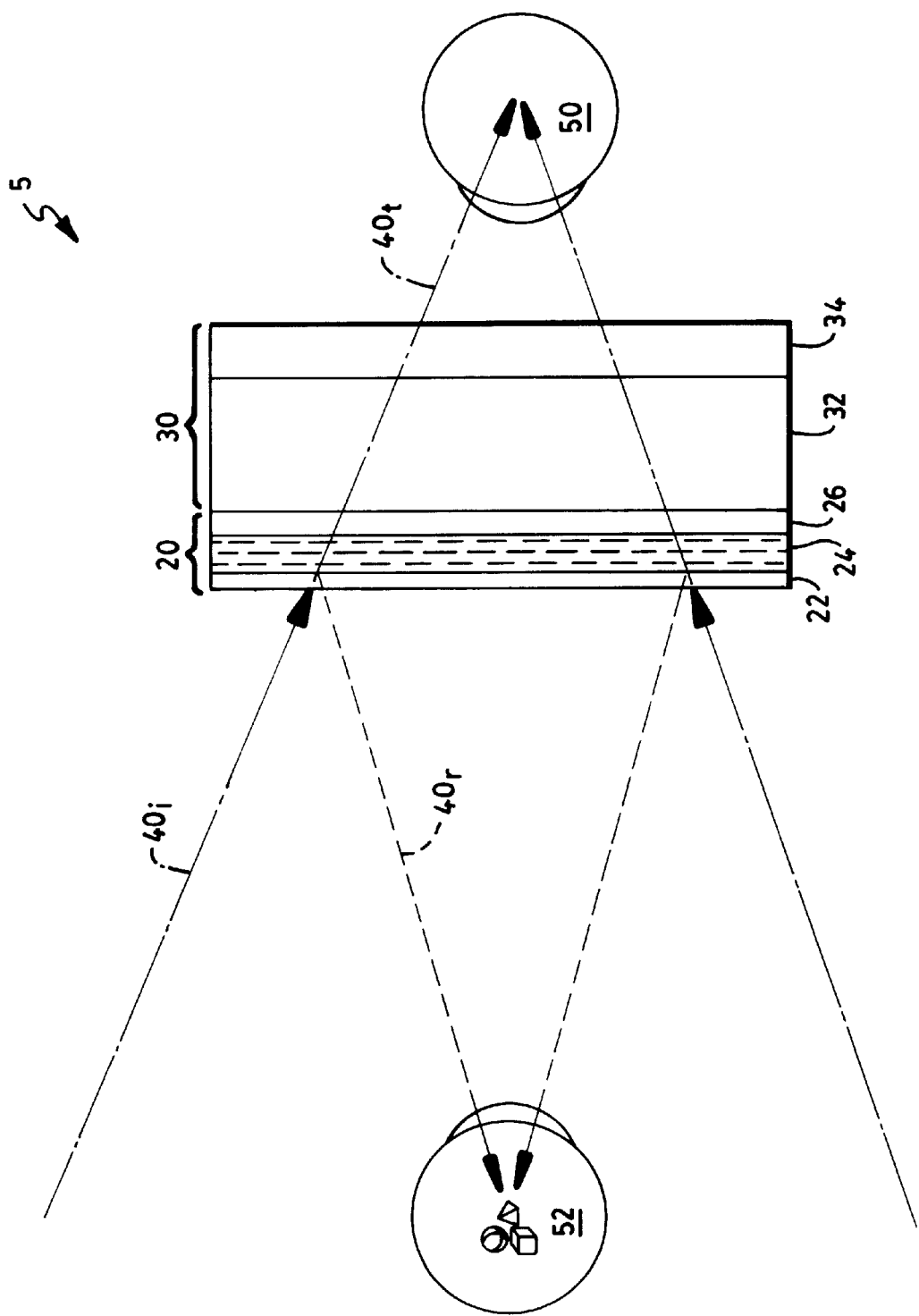
FIG. 1 is a schematic illustration of a light transmissive eyepiece of an eye-covering article according to a representative product embodiment of the present invention, the eyepiece being "viewed through" by a bearer 50 and "observed" by an observer 52.

To more particularly describe the functionality of the eye-covering article, reference is made to FIG. 1. As shown therein, an eyepiece 5 is provided comprising a thin laminar holographic element 20 mounted onto a rigid optical or otherwise light transmissive substrate 30 (which in certain embodiments may comprise a light transmissive base 32 and a polarizer layer 34). Laminar holographic element 20 comprises a light transmissive web 22, a prerecorded planar hologram layer 24, and a light transmissive adhesive layer 26. In a preferred embodiment, light transmissive web 22 has a thickness of about 7 mil (0.178 mm) and is prepared from a durable polymeric material such as polyethylene terephthalate; planar hologram layer 24 has a thickness of about 6.5 $\mu$m and is prepared from DMP-128 (a proprietary photopolymerizable composition from Polaroid Corporation, see U.S. Pat. No. 4,588,664, issued to H. L. Fielding and R. T. Ingwall on May 13, 1986); and light transmissive adhesive layer 26 has a thickness of about 1 mil (0.0254 mm) and is prepared from a preformed, optically clear, pressure-sensitive adhesive. Other components that may be considered for use are set forth further in discussion below.

As stated earlier, planar hologram layer 24 has an interference pattern recorded therein, the interference pattern being holographically representative of a predetermined three-dimensional pattern of intelligence, such as a predetermined three-dimensional object. The predetermined three-dimensional object may be any object having surface and depth, or it may be a depiction of such an object, for example, stylized text rendered in perspective. The object may be singular or compound. It is not necessary that the object be stationary; "moving" images—as is known in the art—can be designed for use in the article. The recorded object may also assume relatively abstract forms. It may be enough to record, for example, optically controlled light beams which, when reconstructed under proper ambient illumination, will provide a visually-observable, three dimensional, decorative light pattern. Despite the several possibilities open for the predetermined three dimensional object, it will be understood that images reconstructed by the present article are intended and designed to be primarily decorative; they are selected to primarily enhance the aesthetic and ornamental qualities of the article. Utilitarian functionality, if any, is either secondary or incidental.

Inspection of the planar hologram layer 24 will reveal the recorded interference pattern as composed of fringes. In accord with the present invention, these fringes—varying in optical properties—lay substantially parallel to the major surfaces of planar hologram layer 24. The characterization of the fringes as laying substantially parallel to major surface of the planar hologram layer should be construed herein with the understanding that deviations from a generalized scientific observation should be expected in actual practice. The subject matter of the present invention is not limited to precise angular relationships. Fringe microstructure should be considered as a whole, and should be contrasted with microstructures found in transmission holograms and the surface relief patterns of embossed holograms. Practitioners in the field of holography will appreciate the subject matter sought to be encompassed by the characterization of the fringes as "substantially parallel." Regardless, microstructural fringe configurations may be visualized in planar hologram layers, for example, by inspection of freeze-fractured cross-sections with a scanning electron microscope. Detail of such method may be found in R. T. Ingwall and M. Troll, "The Mechanism of Hologram Formulation in DMP-128 Photopolymer," *Proceedings of the SPIE,* 883, pp. 94–101 (1988).

It will be appreciated that the functionality of the claimed invention is largely dependent on the method of recording the predetermined three-dimensional object in planar hologram layer 24. This method—described in greater detail below—involves combining an object beam and a reference beam in the planar hologram layer 24 to thereby form a recordable interference pattern. The combination of the beams must be accomplished in accordance with a particular exposure geometry. In the preferred practice, the object beam impinges upon a first side of the planar hologram layer 24 subsequent to interruption by the predetermined three-dimensional object, while concurrently, the reference beam impinges upon a side generally opposite the first.

With planar hologram layer 24 so produced, the eye-covering article is completed by combining eyepiece 5 with desired fitting means (not shown in FIG. 1, but see e.g., FIGS. 3, 4, 5, 6, and 7), the fitting means capable of positioning eyepiece 5 onto a bearer so that eyepiece 5 is superimposed over an eye 50 of said bearer. By the fitting means, eyepiece 5 is superimposed with the "reference beam-impinged" side of planar hologram layer 24 being relatively remote from eye 50 as compared to the "object beam-impinged" side which faces eye 50.

In use, components of ambient irradiation $40_i$ will respond to planar hologram layer 24 to produce either transmitted light $40_t$ and reconstructed light $40_r$. Reconstructed light $40_r$ reflected from planar hologram layer 24 (cf., optically interacting with the fringes of layer 24) will "carry" the phase and amplitude information of the original object beam, and accordingly, will be perceived by observer 52 as a "3-D" image (i.e., a holographic image) of the original three-dimensional object. In contrast, the components of ambient light that do not optically interact with the fringes, i.e., transmitted light $40_t$, will not contain any phase and amplitude information of the original three-dimensional object. The viewer (i.e., bearer 50) will perceive such light only as manipulated or effected by light transmissive substrate 30. In essence, in an eye-covering article of the present invention, the recorded interference pattern will be played back to an "observer" without being "played back" to the bearer.

The arrangement of layers illustrated in FIG. 1—i.e., laminar holographic element 20 being mounted on the surface of substrate 30 remote from the surface intended to be proximate to the bearer—is the preferred configuration of eyepiece 5; the configuration providing good play back. Regardless, it is envisioned that for certain applications, a laminar holographic element may be mounted onto a surface of a light transmissive substrate intended to be proximate to the bearer. Although the relative sequence of the layers remain unchanged, the exposure geometries (discussed further below) used to image the planar hologram layer are reversed. While such configurations are possible, play back may be adversely effected by the greater refractive index differences between the light transmissive substrate and the laminar holographic element.

Several product embodiments can be made through the present invention. A representative sampling of these embodiments are illustrated in FIGS. 3, 4, 5, 6, and 7.

Figure 3:
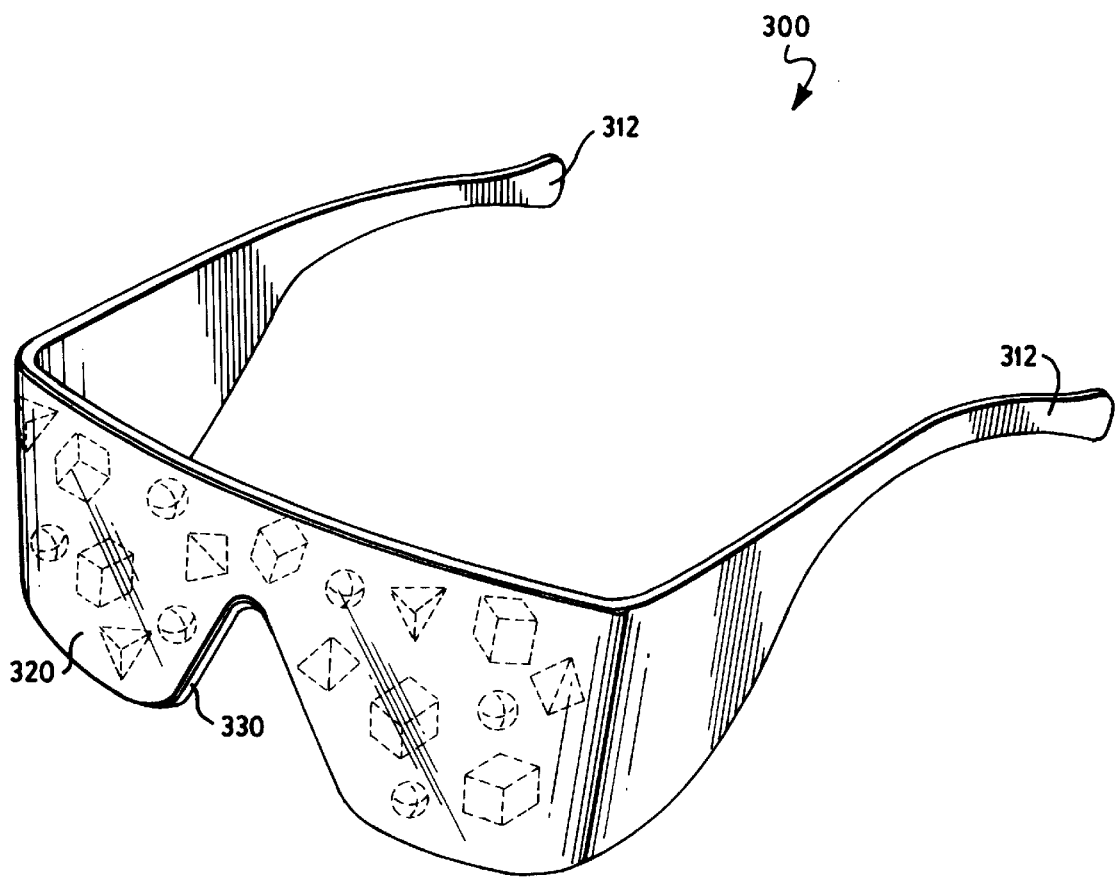
FIGS. 3 to 7 illustrate various embodiments according to product aspects of the present invention. While such embodiments are encompassed as defined in the appended claims, infra, the subject matter of said claims is not limited to the illustrated embodiments. In this light, FIG. 3 representatively illustrates a principal product embodiment of the present invention.

A principal embodiment of the present invention is illustrated in FIG. 3. In FIG. 3, there is shown a sunshade 300 having a single uniaxially curved eyepiece, the eyepiece comprising a laminar holographic element 320 mounted over rigid optical substrate 330. In accordance with the present invention, laminar holographic element 320 is provided with a web-protected holographic recordation of a predetermined three-dimensional object, which are represented in FIG. 3 as the collection of cubes, pyramids, and spheres. In sunshade 300, it will be appreciated the fitting means is integral with rigid optical substrate 330. In this regard, optical substrate 330 curves back upon itself to form lateral arms 312, lateral arms 312 capable of engaging the ears of a bearer. Lateral arms 312 together with a nasal bridge—also formed inherently by the shape of optical substrate 330—allow sunshade 300 to be worn by a bearer in a manner allowing play back of the recordation in laminar holographic element 320 to an observer without play back to the bearer.

While in the present invention at least one eyepiece is superimposed over the eye of a bearer by fitting means, it will be appreciated that in certain embodiments either the planar hologram layer or the area of recordation therein will not correspond with the full extents of the eyepiece. Further, in such embodiments, the holographic recording will not necessarily be superimposed directly over the bearer's eye. Reference may be had to the embodiment illustrated in FIGS. 4 and 5.

Figure 4:
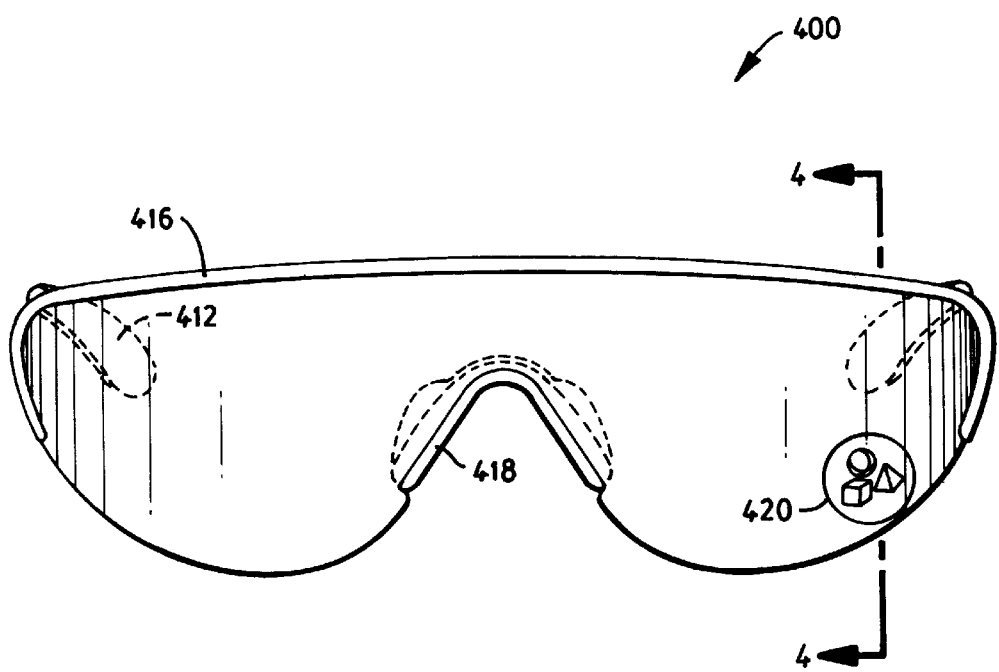
Figure 5:
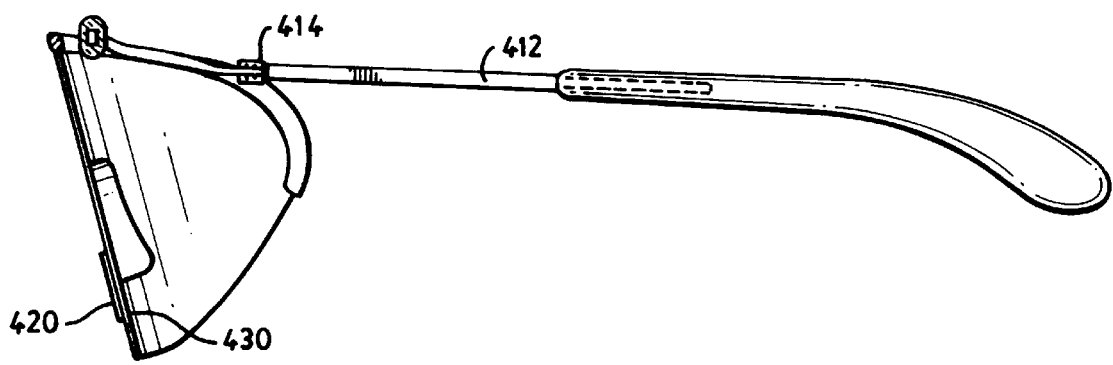

In FIG. 4, there is shown eyewear 400 comprising a single eyepiece, wherein laminar holographic element 420 is mounted onto an area of rigid optical substrate 430. As illustrated, the shape and size of laminar holographic element 420 is not correspondent with the shape and size of the rigid optical substrate 430. Laminar holographic element 420 is configured in eyewear 400 as a "decal" or "label" applied onto a relatively small portion of rigid optical substrate 430. While laminar holographic element 420 will not be superimposed over a bearer's eyes, laminar holographic element 420 will nevertheless be within a bearer's visual field.

In FIG. 4, optical substrate 430 is configured as a uniaxially curved sheet, the configuration being made more rigid by attachment to a peripheral frame 416. As with sunshade 300, laminar holographic element 420 of eyewear 400 is provided with a holographic recordation of a predetermined three-dimensional object, which is represented in the figure again as a collection of cubes, pyramids, and spheres. Eyewear 400 is also provided with ear-engaging arms 412 (shown hinged to peripheral frame 416 by hinge 414) and bridge-engaging member 418. Together, peripheral frame 416, ear-engaging arms 412, and bridge-engaging member 418 allow sunshade 300 to be worn by a bearer in a manner allowing play back of the recordation in laminar holographic element 420 to an observer without play back to the bearer.

While the fitting means in the embodiments represented by sunshade 300 and eyewear 400 both involve the fitting of an eyepiece onto a bearer by engagement to both ears and the nasal bridge, it will be appreciated that such "direct" positioning of an eyepiece is not critical to the practice of the present invention. An example of an embodiment wherein the fitting means do not utilize such direct positioning is illustrated in FIGS. 6 and 7.

Figure 6:
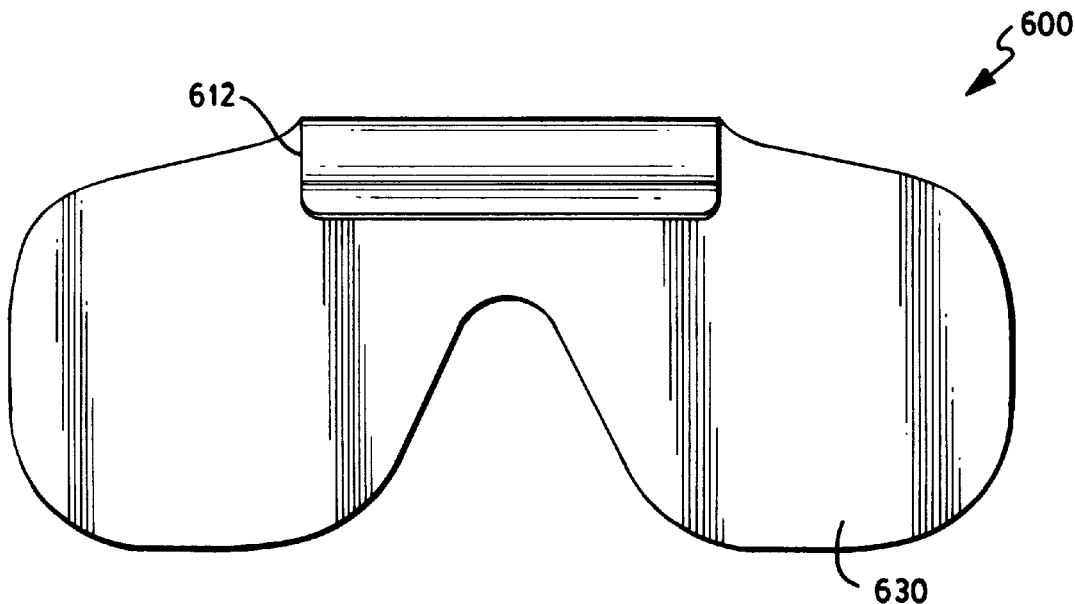
Figure 7:
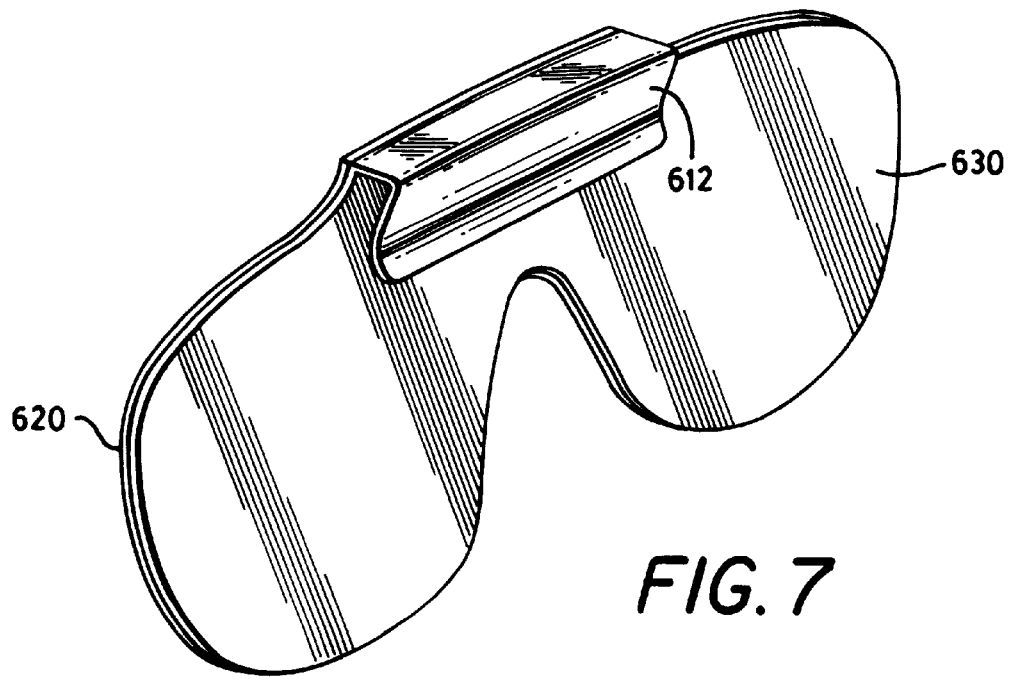

In FIG. 6, there is shown an eyewear accessory 600 comprising a single uniaxially curved eyepiece, wherein web-protected laminar holographic element 620 is mounted onto a rigid optical substrate 630. In accord with the present invention, laminar holographic element 620 will be prepared to contain a holographic recordation therein of a predetermined three-dimensional object. Contiguous and integral with rigid optical substrate 630 is eyewear attachment member 612. Eyewear attachment member 612 is designed to allow engagement of eyewear accessory 600 onto, for example, conventional eyeglasses, the eyeglasses being directly worn by a bearer.

In each of the above-described embodiments, it will be appreciated that the application of a laminar holographic element onto an optical substrate will generally leave unaffected the optical properties of the underlying optical substrate. Theoretically, however, there will be some degree of light attenuation due to the reflection of some incident ambient irradiation for the play back of the holographic recordation. Given the precision of the fringe structure formed in a planar hologram layer, the wavelengths of light reflected at a particular angle by laminar holographic element are of a very narrow and specific range. In light of the ornamental nature of the envisioned eye-covering article, it is expected that this resultant loss in transmitted light will be perceived by the bearer as either trivial or insignificant.

In the present invention, it will be appreciated that the play back properties of a laminar holographic element 20 (and other functionalities) will be defined in great part by its unprecedented construction and the unprecedented method used to record the predetermined three-dimensional object in planar hologram layer 24 contained therein. The steps of the inventive construction and exposure methodology are schematically illustrated in FIGS. 2A to 2G.

In a first step, shown in FIG. 2A, a layer of a photoactivatable formulation 24' is deposited onto a thin (approx. 0.5 to 7 mils (13 to 178 μm)), flexible light-transmissive web 22 to form a holographic medium. Deposition of the formulation may be effected by spin coating, slot coating, curtain coating, and the like.

Light transmissive web 22 comprises a transparent material so that irradiation used for exposure can be transmitted therethrough for imaging the holographic medium. Web 22 can comprise any of a variety of sheet materials, although flexible polymeric sheet materials are preferred. Among preferred materials are polystyrene, polyethylene terephthalate, polyethylene, polypropylene, poly(vinyl chloride), polycarbonate, poly(vinylidene chloride), cellulose acetate, cellulose acetate butyrate, and copolymeric materials such as the copolymers of styrene, butadiene, and acrylonitrile, including poly(styrene-co-acrylonitrile). Inasmuch as (1) reference beam exposure and playback will occur through web 22; and (2) web 22 will be cut and molded in the shaping of an eyepiece, it is suggested that web 22 be optically clear; pliable; and sufficiently thin, yet durable. As indicated above, an especially preferred web material from the standpoints of clarity, durability, dimensional stability, and overall handling characteristics is polyethylene terephthalate.

Where it is desired to use a flexible web of low birefringence, e.g., surface hydrolyzed cellulose triacetate film base, such a coated film may be laminated to a glass plate with the photoactivatable coating outermost. Such a construction provides the benefits of continuous coating technology and rigidity during exposure, as well as avoiding exposure of the film base to solvents used in the various processing solutions, particularly where such solvents might adversely affect the flatness or dimensional stability of the film base.

Where non-coextensive laminar holographic elements are desired (see FIG. 4), web 22 can comprise predetermined transferable regions (not shown) configured for holographic exposure, with means (such as region-circumscribing perforations) provided for promoting the removal of said region following application onto and shaping of an eyepiece.

The photoactivatable formulation may be made of any composition that is actinically-activatable by exposure to coherent irradiation, and whereby fringe structures (as described herein) are produced when the composition is deposited as a planar layer and appropriately exposed. Compositions that may be considered for use include DMP-128 (a proprietary photopolymer from Polaroid Corporation), dichromated gelatin, silver-halide based compositions, and compositions described in U.S. Pat No. 4,588,664, issued to F. L. Fielding and R. T. Ingwall on May 13, 1986, and U.S. Pat. No. 4,696,876, issued to J. J. Cael on Sep. 29, 1987. As indicated above, DMP-128 is the preferred material and generally comprises a dye sensitizer, a branched polyethylenimine, and a free radical polymerizable ethylenically unsaturated monomer. Particular details of the composition may be found in U.S. Pat. No. 4,588,664. See also, W. C. Hay and B. D. Guenther, "Characterization of Polaroid's DMP-128 Holographic Recording Medium", *Proceedings of the SPIE*, 883, pp. 102–105 (1988).

The coating thickness of the photoactivatable composition is not particularly critical and may be selected according to the features and aspects desired in the resultant hologram. Illustratively, for example, the dry thickness of the layer of photopolymerizable composition based on DMP-128 will be about 2–10 microns, although coatings may be as thick as 25–30 microns for certain applications.

In a second step, shown in FIG. 2B, a predetermined three-dimensional object is holographically recorded in unexposed layer 24' of the holographic medium. In this recordation step, an interference pattern is provided by the combination of an object beam $42_o$ and a reference beam $42_r$ in unexposed layer 24'. During exposure, the object beam $42_o$ impinges upon planar hologram layer 24 from a first side subsequent to interruption by the desired predetermined three-dimensional object. At the same time, the reference beam $42_r$ impinges upon the planar hologram layer 24 from a second side opposite the first side. In accomplishing such exposure, both on-axis and off-axis exposure geometries may be implemented. In either case, the reflection hologram produced will be characterized by holographic fringes—having varying optical properties—laying substantially parallel to the major surfaces of planar hologram layer 24.

The exposure time may be readily determined by routine testing, as is well known in the art, and will vary according to the intensity of the exposing radiation, the distance from the object to the photopolymerizable element, and like factors. These factors may be varied as necessary to change the exposure duration, either shorter or longer, as desired to obtain the preferred combination of exposure duration and light intensity for a given recordation. It will be appreciated that in the formation of a volume phase hologram on DMP-128, a subsequent non-imagewise or flood exposure to white light is useful to "fix" the photopolymerizable layer.

It will be appreciated that the production of original volume phase reflective holograms may be inconsistent with desirable product process times. Accordingly, an original hologram may be utilized as a master for the mass production of several duplicate holograms. Several processes are known in the art for the mass production of reflection holograms. See e.g., U.S. Pat. No. 4,995,685; and "Copying Reflection Holograms," *Journal of the Optical Society of America*, vol. 58, pp. 856–857 (June 1968). One skilled in that art, in view of the present disclosure, may readily incorporate such methodology into the present invention. Accordingly, the method of the present invention should not be construed as limited to those involving the production of original holograms.

Subsequent to its exposure, the recording medium may then be processed to develop the recorded latent interference pattern and thereby produce a reflection hologram. In this regard, the recording medium may be developed to, for example, intensify the imaged element (such as by treatment with 2-isopropanol in the case of DMP-128), or to "fix" (or otherwise make more stable) photopolymeric reaction products (cf., fringe structures) actinically generated by the exposure. Certain details concerning the use and processing of photopolymerizable compositions used for holographic recordings can be found, for example, in aforementioned U.S. Pat. No. 4,588,664, issued to H. L. Fielding and R. T. Ingwall on May 13, 1986; aforementioned U.S. Pat. No. 4,696,876, issued to J. J. Cael on Sep. 27, 1987, and U.S. Pat. No. 5,198,912, issued to R. T. Ingwall, M. A. Troll, and D. H. Whitney on Mar. 30, 1993. Those skilled in the art will know of the various methods for processing the various types of recording media that may be used in the present invention.

It will be appreciated that subsequent processing will depend on the nature of the selected recording medium. Accordingly, construction of the term "development" will compel consideration of the processes desired and/or required to finalize, or otherwise prepare for use, a particular imaged recording medium.

In a third stage, as depicted in FIG. 2C, a light-transmissive adhesive layer 26 is deposited onto the recorded planar hologram layer 24 on the side opposite light transmissive web 22. The adhesive layer 26 may be applied to the web-borne planar hologram layer 24 through several different methodologies. It can be coated, for example, directly onto the planar hologram layer 24 out of organic or aqueous based solvent mixtures, or it can be applied, for example, by hot melt extrusion, lamination, or coating.

The adhesive layer may be prepared from a composition comprising, for example, a major amount of one or more thermoplastic polymers and may optionally contain such other desired components as UV-absorbers, anti-static compositions, optical brighteners, inert fillers, and plasticizers. The adhesive material should remain tacky and non-drying throughout the application thereof. For certain embodiments, a desirable material is one that is designed as a flow modifier for improving the production of polymeric films generally, including the reduction of "pin holes," "fish eyes," and "orange peel" effects in film. In a preferred embodiment of the present invention, a preformed, double-sided, pressure-sensitive adhesive tape such as Kayapolar AD-20 (from Kayapolar Corp., Tokyo, Japan) is used.

In a fourth stage, shown in FIG. 2D, the laminar holographic element 20 is mounted onto a desired and appropriate light transmissive substrate, such as optical substrate 30. Such mounting can be accomplished in several ways depending on the nature of the materials selected for adhesive layer 26 and optical substrate 30. Those skilled in the art will know of the appropriate methodologies for activating the adhesive layer 26 to effect the mounting of laminar holographic element 30. In the preferred embodiment, wherein adhesive layer 26 comprises a pressure sensitive adhesive, mounting involves the positioning of laminar holographic element 20 onto a desirable area of optical substrate 30 followed by application of pressure sufficient to activate the pressure sensitive adhesive, thereby effecting adhesion onto optical substrate 30.

Materials that may be selected for optical substrate 30 are those that will permit transmission of light therethrough adequate for human vision. Glass and plastics, such as those used for light-transmissive web 22, can be used. In the preferred embodiment of the present invention, optical substrate 30 is a light-weight, durable plastic material—the several varieties of which will be known to those skilled in the art—having colorants incorporated therein to effect the attenuation of light. Configured as such, the embodiment may be used as sunglasses.

In embodiments wherein optical substrate 30 is configured as a light polarizing structure, optical substrate 30 may include a polarizing system (see FIG. 1, layer 34), the polarizing system comprising a light polarizer laminated between two sheets of transparent plastic material. The light polarizer may be, for example, a molecularly oriented plastic sheet material which has been stained or dyed to render it light polarizing, e.g., molecularly oriented polyvinyl alcohol stained with iodine. The transparent plastic between which the polarizing sheet is laminated may, for example, be a thermoplastic cellulose derivative, e.g., cellulose nitrate, cellulose triacetate, cellulose acetate propionate, cellulose acetate butyrate, ethyl cellulose, or the like.

Figure 2E:
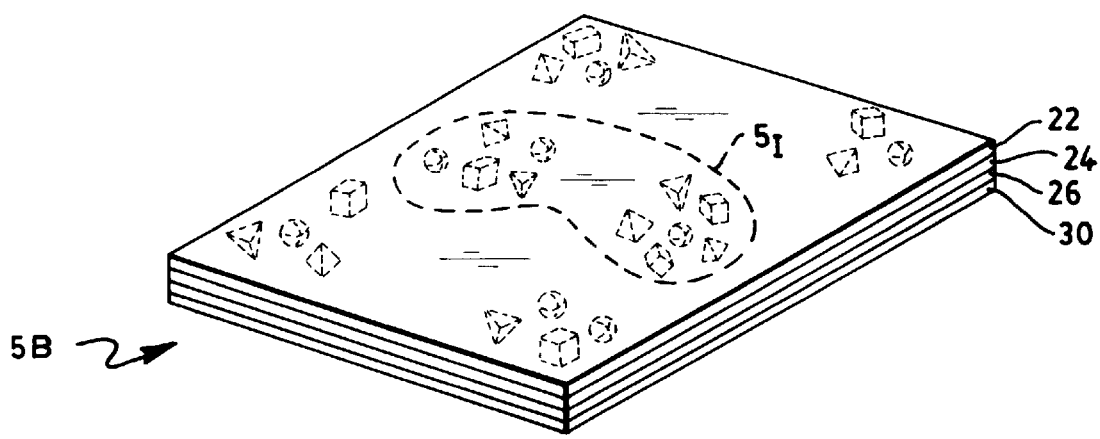

While—for ease of illustration—only a single holographic exposure is depicted in FIG. 2B, in the practice of the inventive methodology, the unitary holographic recording medium 20 will be exposed and processed to comprise several groupings of holograms (as depicted in FIG. 2E), each grouping corresponding to the hologram(s) desired for incorporation into the eyepiece.

Figure 2F:
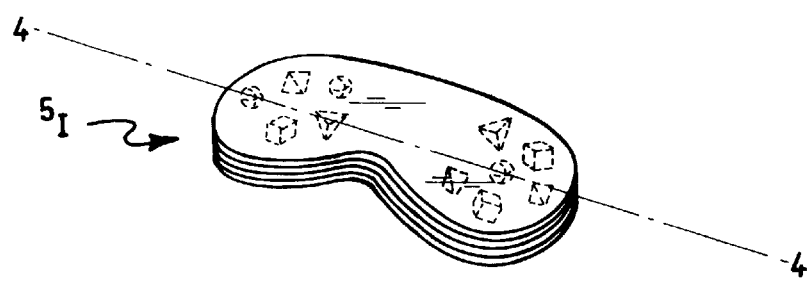

Thus, in a further step, depicted in FIGS. 2E and 2F, an eyepiece blank $5_I$ is cut (following a desirable predetermined eyepiece pattern, wherein said pattern encompasses at least a portion of said hologram of said predetermined three dimensional object) and ultimately removed from the flat unitary holographic laminate $5_B$. Cutting can be made in a number of ways, including by a rolling knife cutter, reciprocal stamping cutter, a straight edge cutting knife, a rotary or swing die, or a laser cutter. Other like means of "dinking out" the eyepiece blank $5_I$ from unitary laminate $5_B$ will be apparent to the skilled artisan in light of the present application.

As an alternative to removing eyepiece blank $5_I$ from unitary laminate $5_B$, an eyepiece blank $5_I$ can also be provided by adhering a precut eyepiece-shaped volume-phase reflection hologram onto a correspondingly shaped precut optical substrate. It will be appreciated, however, that such alternative methodology complicates the manufacturing process by introducing the need to monitor and insure the accurate registration of the combined precut elements.

Figure 2G:
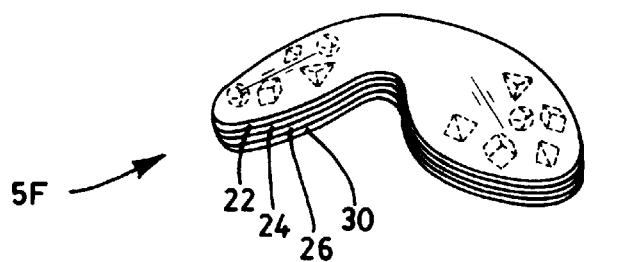

Finally, as depicted in FIG. 2G, the flat eyepiece blank $5_I$ is then further shaped (e.g., molded, bent, or otherwise curved) to form a uniaxially curved eyepiece $5_F$. In accord with objectives of the present invention, the formation and use of a single uniaxially curved eyepiece reduces the costs and additional procedures associated with the manufacture, relative positioning, and mounting of paired eyepieces in a standard eyewear configuration.

Curving of eyepiece blank $5_I$ can be accomplished, for example, by heating or otherwise softening eyepiece blank $5_I$, then compressing it between a pair of mated dies. Although not preferred, it is contemplated that molding can also be accomplished by manipulating (e.g., bending) the eyepiece blank $5_I$ into the desired uniaxially-curved configuration, then retaining said configuration within a rigid frame.

It will be appreciated that whereas the laminar holographic element is primarily incorporated for its decorative functionality, the underlying light transmissive substrate may otherwise have significant practical use. Further, while the present invention is particularly drawn to sunglasses, it is envisioned that the invention may assume several configurations, e.g., eyeglasses, novelty eyewear, goggles, ski masks, helmet visors, Halloween masks, and the like.

Accordingly, while only a few illustrative embodiments of the invention have been described, it is understood that various modifications will be apparent to one skilled in the art in view of the totality of the description herein. All such modifications are within the spirit and scope of the invention as encompassed by the appended claims.

We claim:

1. A method for manufacturing an eye-covering article, the eye-covering article capable of being worn by a bearer, the eye-covering article having a holographically prerecorded interference pattern, the interference pattern capable of being played back to an observer without being played back to said bearer, the method comprising the steps of:

(a) providing a recordable medium comprising a photoactivatable composition deposited on a flexible optically transparent web, the photoactivatable composition being activatable to coherent irradiation such that the recordable medium is holographically recordable, the flexible optically transparent web being a 17 to 178 $\mu$m thick sheet, the photoactivatable composition deposited at a dry coating thickness of 2 to 30 $\mu$ms;

(b) exposing the recordable medium to beams of coherent irradiation to produce a volume phase reflection holographic recordation of a predetermined three-dimensional object on said flexible optically transparent web, the exposure being accomplished by impinging a reference beam upon the recordable medium at a first side while impinging an object beam upon the recordable medium at a second side opposite the first side, the reference beam impinging the recordable medium through the optically transparent web;

(c) depositing an adhesive layer onto the web-borne volume phase reflection hologram layer opposite the carrier web;

(d) adhering the web-borne volume phase reflection hologram onto a rigid flat light-transmissive plastic substrate to form a flat holographic laminate, the flat laminate comprising in sequence the web, the holographically recorded medium, the adhesive layer, and the light-transmissive plastic substrate, the plastic substrate, by the inclusion of colorants therein, capable of attenuating light;

(e) cutting and removing from said flat holographic laminate a predetermined unitary eyepiece-shaped blank encompassing at least a portion of said hologram of said predetermined three-dimensional object, thereby providing a flat eyepiece blank;

(f) curving the removed eyepiece blank to form a uniaxially-curved eyepiece, said curving involving the softening by heating of said eyepiece blank; and (g) providing the uniaxially-curved eyepiece with fitting means to produce the eye-covering article, the fitting means capable of positioning the eyepiece onto said bearer so that the eyepiece is superimposed over both eyes of said bearer, the eyepiece being superimposed with the web-side facing away from said eye and the substrate-side facing toward said eye.

2. The method of claim 1, wherein the fitting means comprise eyeglass frames.

3. The method of claim 1, wherein the photoactivatable composition is a photopolymeric formulation comprising a dye sensitizer, a branched polyethylenimine, and a free radical polymerizable ethylenically unsaturated monomer.

4. The method of claim 1, wherein the light-transmissive substrate is further provided with a polarizer layer.

5. An eye-covering article manufactured according to the method of claim 1.

6. The eye-covering article of claim 5, wherein a single uniaxially-curved holographic eyepiece is provided with fitting mean in said production of said eye-covering article, the fitting means capable of positioning the eyepiece onto said bearer so that the eyepiece is superimposed over both eyes of said bearer.

7. The eye-covering article of claim 1, wherein said photoactivatable composition comprises a dye sensitizer, a branched polyethylenimine, and a free-radical polymerizable ethylenically unsaturated monomer.

8. The eye-covering article of claim 7, wherein the adhesive layer is a double-sided pressure sensitive adhesive.

9. The eye-covering article of claim 8, wherein the flexible optically transparent web is polyethylene terephthalate.

* * * * *